UNITED STATES PATENT OFFICE.

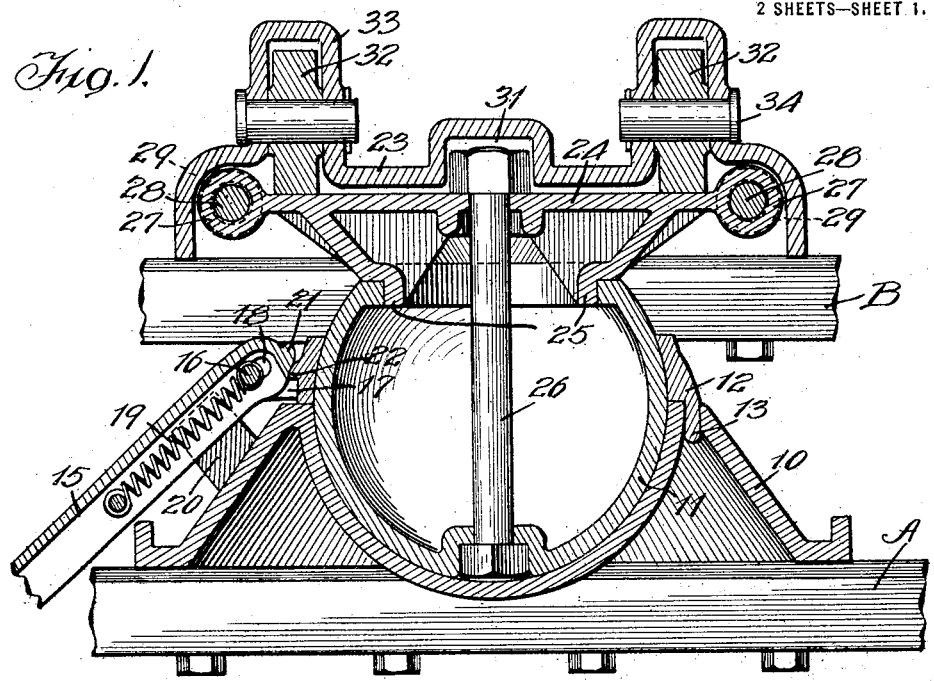
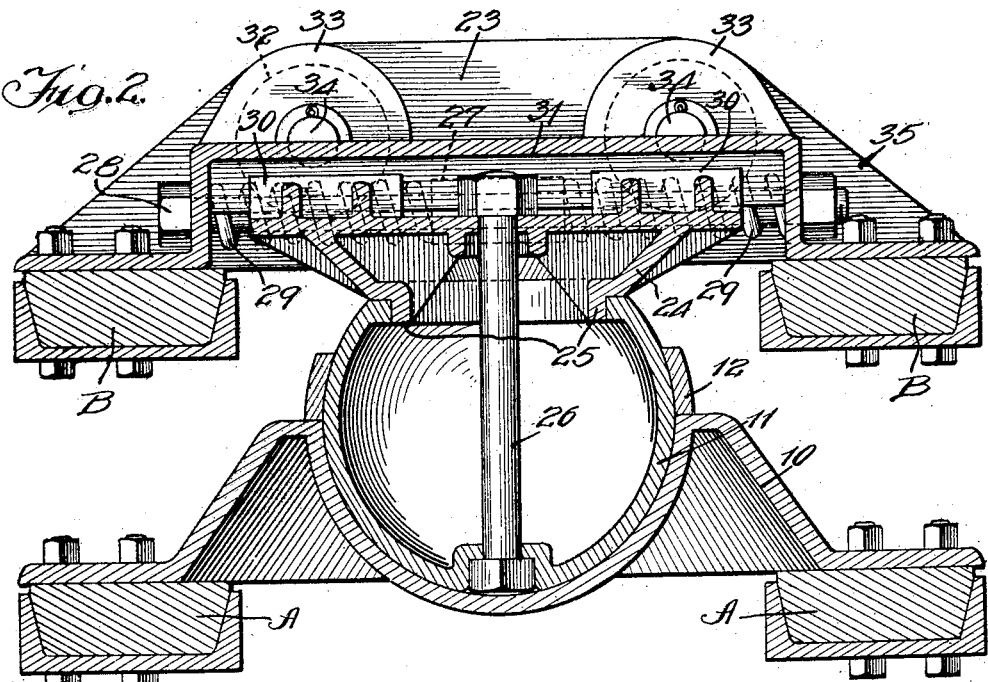

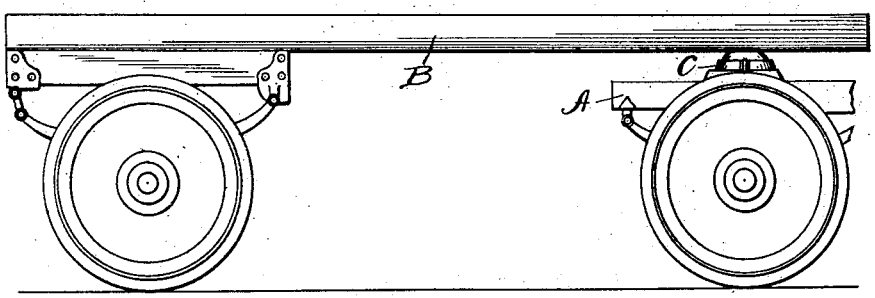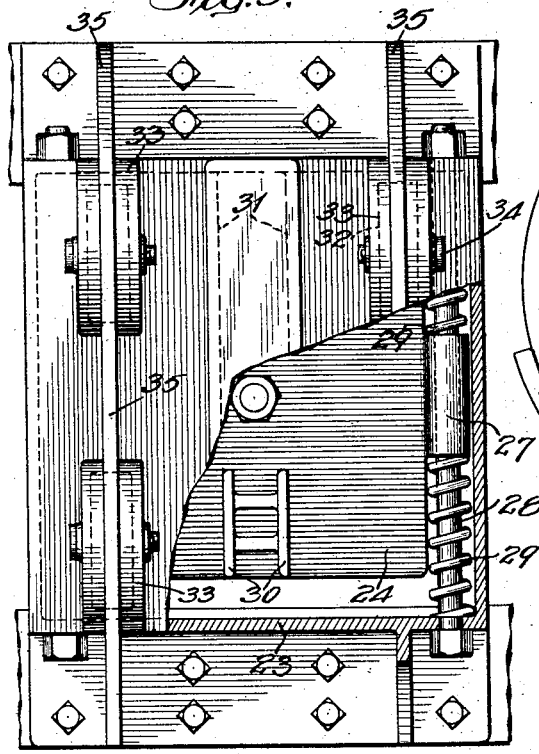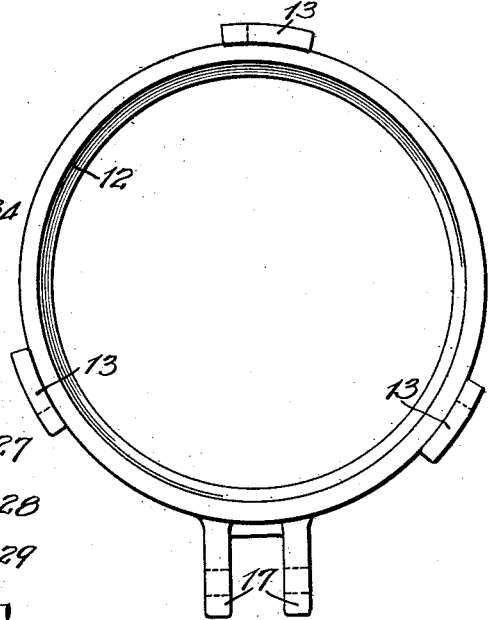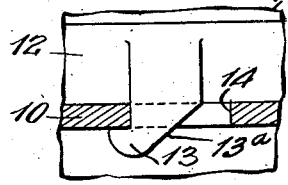

ADDI BENJAMIN CADMAN, OF BELOIT, WISCONSIN, ASSIGNOR TO WARNER MANUFACTURING COMPANY, OF SOUTH BELOIT, ILLINOIS, A CORPORATION OF WISCONSIN.

VEHICLE-COUPLING.

1,399,250.   Specification of Letters Patent.   Patented Dec. 6, 1921.

Application filed July 10, 1918. Serial No. 244,222.

*To all whom it may concern:*

Be it known that I, ADDI BENJAMIN CADMAN, a citizen of the United States, residing at Beloit, in the county of Rock and State of Wisconsin, have invented certain new and useful Improvements in Vehicle-Couplings, of which the following is a specification.

This invention relates to an improved vehicle coupling which is intended for attaching a special type of trailer truck to a drawing vehicle such as a motor truck or tractor. The trailer comprises a bed or frame supported at its rear end upon a single pair of wheels, the forward end of the bed overlapping the rear end of the bed or frame of the tractor vehicle. The coupling is interposed between these overlapping portions of the two vehicle beds.

The general object of the invention is to provide an improved coupling which is capable of allowing relative movement of the two vehicle frames in all directions and also to permit yielding movements to cushion road shocks in the line of draft.

Pursuant to this general object it is the aim of the invention to provide a coupling of this character which comprises a ball and socket joint; which may be coupled and uncoupled easily; which may be securely locked in coupled position; which comprises sections arranged to have relative sliding movement in the line of draft and being spring-cushioned to take up shocks; which is constructed to eliminate any binding or undue friction between these sections so that the spring-cushioned movements of the sections may take place no matter what the relative positions of the two vehicles may be; and which is simple, strong, durable and compact.

In the accompanying drawings, Figure 1 is a vertical transverse sectional view through a coupling embodying the features of my invention. Fig. 2 is a similar view taken in a plane at right angles to the plane of Fig. 1. Fig. 3 is a top plan view of the coupling with a portion of the top section broken away to disclose parts beneath. Fig. 4 is a detail view of the retaining annulus for holding the ball in the socket. Fig. 5 is a fragmental sectional detail view illustrating one of the devices for securing the retaining annulus to the socket member. Fig. 6 is a side elevational view showing the rear end of a tractor vehicle and a trailer truck of the type for which my coupling is especially designed.

I will herein describe the preferred embodiment of the invention illustrated in the drawings but it should be understood that I do not thereby intend to limit the invention to the exact construction disclosed. The scope of the invention will be pointed out in the appended claims.

Referring first to Fig. 6, A designates the rear end of the frame or bed of a drawing vehicle which may be a motor truck or tractor. The trailer truck is designated by B and the forward end of the bed of the trailer overlies the rear end of the motor truck bed. The coupling is indicated at C.

The coupling comprises a socket element 10 which is removably secured as by means of bolts upon the rear end of the tractor bed A. The remainder of the coupling is secured to and carried by the trailer bed B and this portion of the coupling includes a ball 11 which is adapted to fit in the socket 10 and is upwardly withdrawable therefrom when desired, the socket proper being of semi-spherical shape to embrace only the lower half of the ball.

The ball is retained in the socket by means of a retaining member in the form of an annulus 12 which surrounds the ball and fits closely thereupon, the internal diameter of the annulus being such that it snugly fits the ball when the annulus rests upon the upper edge of the socket member. The annulus is arranged to be detachably secured to the socket member by means which, in the present instance, comprises a plurality of hooks 13 which depend from and may be integral with the annulus, and the socket 10 has corresponding slots 14 (see Fig. 5) to receive the hooks 13. The slots 14 are of such length that the hooks may be passed down therethrough and so that by rotating the annulus the hooks may be engaged beneath the walls at the ends of the slots to prevent upward displacement of the annulus.

Means is provided for locking the annulus in position with the hooks 13 engaged beneath the said walls. This locking means in the preferred form, comprises a lever 15 which is pivoted on a pin 16 carried by a pair of ears 17 between which one end of the lever lies. The lever has a slot 18 to receive the pin 16 and to allow longitudinal as well as swinging movement of the lever. A coiled tension spring 19 attached at one end of the pin 16 and at its other end to a pin carried by the lever, tends to draw the lever longitudinally toward the annulus 12. When swung downwardly into its locking position the lever engages between two projections 20 formed on the socket member 10, and thus the lever is prevented from moving sidewise and therethrough the retainer 12 is locked against rotary movement to disengage the hooks 13. On the end of the lever 15, adjacent to the annulus, is a projection 21 providing a square shoulder on one side and a cam surface on the other side. A similar projection 22 on the annulus has its shoulder and cam face disposed oppositely to those on the projection 21. When the lever is in locking position as seen in Fig. 1, the cam faces of the two projections bear against each other and coöperate to hold the lever in engagement with the projections 20. The spring 19 maintains the lever in position with the projections 21, 22 in contact. In this manner the lever is securely held in locking position and is prevented from jumping out of place when the vehicles are traveling over rough roads.

When it is desired to uncouple the vehicles the lever 15 is grasped and drawn longitudinally as far as permitted by the slot 18 whereupon the lever is swung upwardly to disengage it from the projections 20. In this position, if the lever is released to the action of the spring 19, the projection 21 on the lever will engage beneath the projection 22 on the annulus so that the lever will be held in approximately horizontal position, the spring 19 retaining said projections in such engagement. In this position of the lever the annulus may be rotated to disengage the hooks 13 and by continuing the rotation the inclined faces 13ª on the hooks cam against the ends of the slots 14 and raise the annulus until the lower ends of the hooks rest on the top of the socket member 10. The forward end of the trailer bed B may now be elevated to remove the ball 11 from the socket 10. In such removal the annulus 12 stays on the ball since the internal diameter of the upper edge of the annulus is less than the largest diameter of the ball. The lever 15, of course, being mounted on the annulus, moves with it and all of these parts are carried by the trailer truck.

The upper portion of the coupling comprises a housing section 23 and an intermediate section 24 inclosed by the housing and which carries the ball 11. In the present instance the section 24 and the ball are made in separate pieces, the ball having a non-circular opening to receive a correspondingly shaped projection 25 on the lower side of the member 24. A bolt 26 passing through the ball and through the section 24 rigidly secures these two elements together. Midway of its opposite sides the section 24 has a pair of bearings 27 (see Fig. 3) which receive a pair of guides in the form of bolts 28 which bolts are rigidly carried by the housing section 23. Two pairs of coiled springs 29 surround these bolts at opposite sides of the bearings 27 so that the relative sliding movements between the two sections 23, 24 will be cushioned in either direction. Additional guide means is provided in the form of upstanding projections 30 on the top of the section 24 which projections lie in a groove 31 formed by the upper wall of the housing section 23. This groove also accommodates the nut on the bolt 26. This supplementary guide means lends additional strength and rigidity to the construction.

A plurality of rollers 32 are carried by the housing section 23 and run upon the upper face of the section 24 so that any binding or undue friction between these two sections 23, 24 is reliably prevented. In the present instance there are four of the rollers 32 and the housing section 23 is shaped to provide individual casings 33 for the rollers, the journal studs 34 of the rollers passing through the opposed vertical walls of these casings 33. The rollers fit snugly between such vertical walls. If desired, strengthening webs 35 may be formed in the planes of the casings 33.

Inasmuch as the guide bolts 28 extend in a front-to-rear direction or in the line of draft, the shocks of the trailer caused by passing over rough roads or obstacles will be taken up in a large measure by the cushioning springs 29 so that the strain on the parts of the coupling is considerably reduced. The construction of the coupling is such that the trailer may extend at any angle to the tractor in making turns and the trailer bed may tip to either side within wide limits, and the relatively yielding movements between the upper portions of the coupling may freely take place, irrespective of the direction in which the trailer bed extends with reference to the tractor bed and irrespective of the degree of divergence in the planes of the two beds caused by the lateral tipping of either.

I claim as my invention:

1. A vehicle coupling of the character described comprising a socket member adapted to be attached to a drawing vehicle and having an upwardly opening semi-spherical socket, an upper structure adapted to be secured to the underside of an overlapping trailer bed and including a ball adapted to fit in said socket and which is upwardly withdrawable therefrom, means for securing the ball in the socket, said upper structure further including a top housing section adapted to be rigidly mounted on the trailer bed, and an intermediate section beneath said housing section, which intermediate section has the said ball rigidly affixed thereto, cooperating guide means on said housing and said intermediate seections, allowing relative sliding movement of these two sections in the line of draft of the vehicles, bolts within the housing rigid therewith and slidably engaging the intermediate section whereby to connect the two sections together so as to permit such relative movement therebetween, springs on said bolts arranged to cushion such relative sliding movement, and rollers mounted in the housing section and bearing against said intermediate section to prevent binding or undue friction during such relative movement.

2. A vehicle coupling of the character described having, in combination, a socket member adapted to be rigidly attached to one vehicle, an opposed member adapted to be rigidly attached to another vehicle, an intermediate section having a ball fitting in said socket and withdrawable therefrom, means carried by the last mentioned vehicle for detachably locking the ball in the socket including a combined operating and locking hand lever, guide means allowing relative sliding movement between said opposed member and said intermediate section, spring means cushioning such sliding movements, and rollers coacting between said opposed member and said intermediate section for preventing binding or undue friction between these parts.

3. A vehicle coupling of the character described comprising, in combination, a socket adapted to be secured to one vehicle, a housing adapted to be secured to another vehicle, an intermediate section carrying a ball to engage in said socket and having a flat upper side, means for securing the ball in place, a pair of bolts carried by said housing, bearings on opposite sides of said intermediate section slidably receiving said bolts, two pairs of springs surrounding said bolts at opposite sides of said bearings for cushioning the relative sliding movements between said housing and said intermediate section, and a plurality of rollers journaled in the housing and running upon the upper flat side of said intermediate section.

4. A vehicle coupling of the character described, comprising, in combination, an upwardly opening socket adapted to be attached to a drawing vehicle, a housing adapted to be attached to a trailing vehicle, an intermediate section beneath said housing carrying a ball to removably engage in said socket, means for detachably securing the ball in the socket, a pair of bolts carried by the housing, a pair of bearings on opposite sides of said intermediate section slidably surrounding said bolts, coiled compression springs surrounding the bolts at opposite sides of said bearings and arranged to cushion the sliding movements, said housing having a guide-way intermediate said bolts, upstanding projections on the upper side of said intermediate section engaging in said guide-way, said housing further having a plurality of individual roller casings with parallel vertical walls, and a plurality of rollers fitting between the walls of said casings and journaled therein, said rollers running upon the upper surface of said intermediate section.

5. A vehicle coupling comprising, in combination, an upwardly opening socket adapted to be attached to a drawing vehicle, a ball adapted to be mounted on a trailing vehicle and to engage in said socket, a retaining annulus carried by and entirely surrounding said ball and having a detachable engagement with said socket, and means for locking said annulus in the position in which the annulus is engaged with the socket comprising a depending arm pivoted on said annulus and adapted to engage said socket to prevent movement of said annulus.

6. A vehicle coupling comprising, in combination, a socket, a ball fitting therein, a retaining annulus surrounding the ball, means for detachably securing the annulus to the socket, said means being operable by a rotary movement of the annulus, and means for locking the annulus against such rotary movement comprising a lever pivoted on said annulus and a lug formed on said socket.

7. A vehicle coupling comprising, in combination, a socket, a ball fitting therein, a retaining annulus surrounding the ball, means for detachably securing the annulus to the socket, said means being operable by a rotary movement of the annulus, a locking lever pivoted at one end on the annulus, means on said socket to receive said lever for preventing rotary movement of the annulus, and means for holding said lever in engagement with the last mentioned means.

8. A vehicle coupling comprising a ball and a socket, an annulus surrounding the ball, and having means to detachably engage with the socket by a rotary movement of the annulus, and a device mounted on the annulus adapted to move said annulus into and out of locking position and movable into and out of engagement with a part on the socket for preventing rotary movement of the annulus.

9. A vehicle coupling comprising, in combination, a ball and a socket, an annulus surrounding the ball, the socket having a plurality of slots therein, hooks on the annulus arranged to pass through said slots and to move into engagement with the end walls of the slots, and means to lock said hooks in such engaged position.

10. A vehicle coupling comprising, in combination, a ball and a socket, an annulus surrounding the ball, the socket having a plurality of slots therein, hooks on the annulus arranged to pass through said sslots and to move into engagement with the end walls of the slots by a rotary movement of the annulus, a lever pivoted on the annulus and arranged to engage with a part on the socket to hold the annulus in position with such hooks engaged, and means for holding said lever in its locking position.

11. A vehicle coupling comprising a ball and a socket, an annulus surrounding the ball and having means to detachably engage the socket, for holding the ball therein, and means for locking the annulus and the socket together comprising a member movably mounted on one of said parts and arranged to detachably engage the other part, said locking means being adapted to move said annulus into and out of locking position.

12. A vehicle coupling comprising, in combination, a ball and a socket, an annulus surrounding the ball and having means to detachably engage the socket for holding the ball therein, and means for locking the annulus and the socket together comprising a lever pivoted on one of said parts and arranged to engage the other part, and means including a spring and cam faces for holding said lever in its locking position.

13. A vehicle coupling comprising a ball and a socket, an annulus surrounding the ball and having depending hooks to detachably engage in slots in the socket, a lever pivoted at one end on the annulus, projections on the socket to receive said lever and preventing rotary movement of the annulus, the lever having a slot receiving its pivot to allow longitudinal movement of the lever, a spring tending to longitudinally move the lever toward the annulus, and coöperating cam faces on the lever and the annulus, which cam faces are held in engagement by said spring to hold the lever in engagement with said projections.

In testimony whereof, I have hereunto set my hand.

ADDI BENJAMIN CADMAN.

It is hereby certified that in Letters Patent No. 1,399,250, granted December 6, 1921, upon the application of Addi Benjamin Cadman, of Beloit, Wisconsin, for an improvement in "Vehicle-Couplings," an error appears in the printed specification requiring correction as follows: Page 3, claim 8, line 119, after the syllable "nulus" and before the period insert the phrase *when in locking position;* and that the said Letters Patent should be read with this correction therein that the same may conform to the record of the case in the Patent Office.

Signed and sealed this 3d day of January, A. D., 1922.

[SEAL.]

WM. A. KINNAN,

*Acting Commissioner of Patents.*